No. 758,155. PATENTED APR. 26, 1904.
G. STROH.
HOSE COUPLING.
APPLICATION FILED MAR. 18, 1903.
NO MODEL.
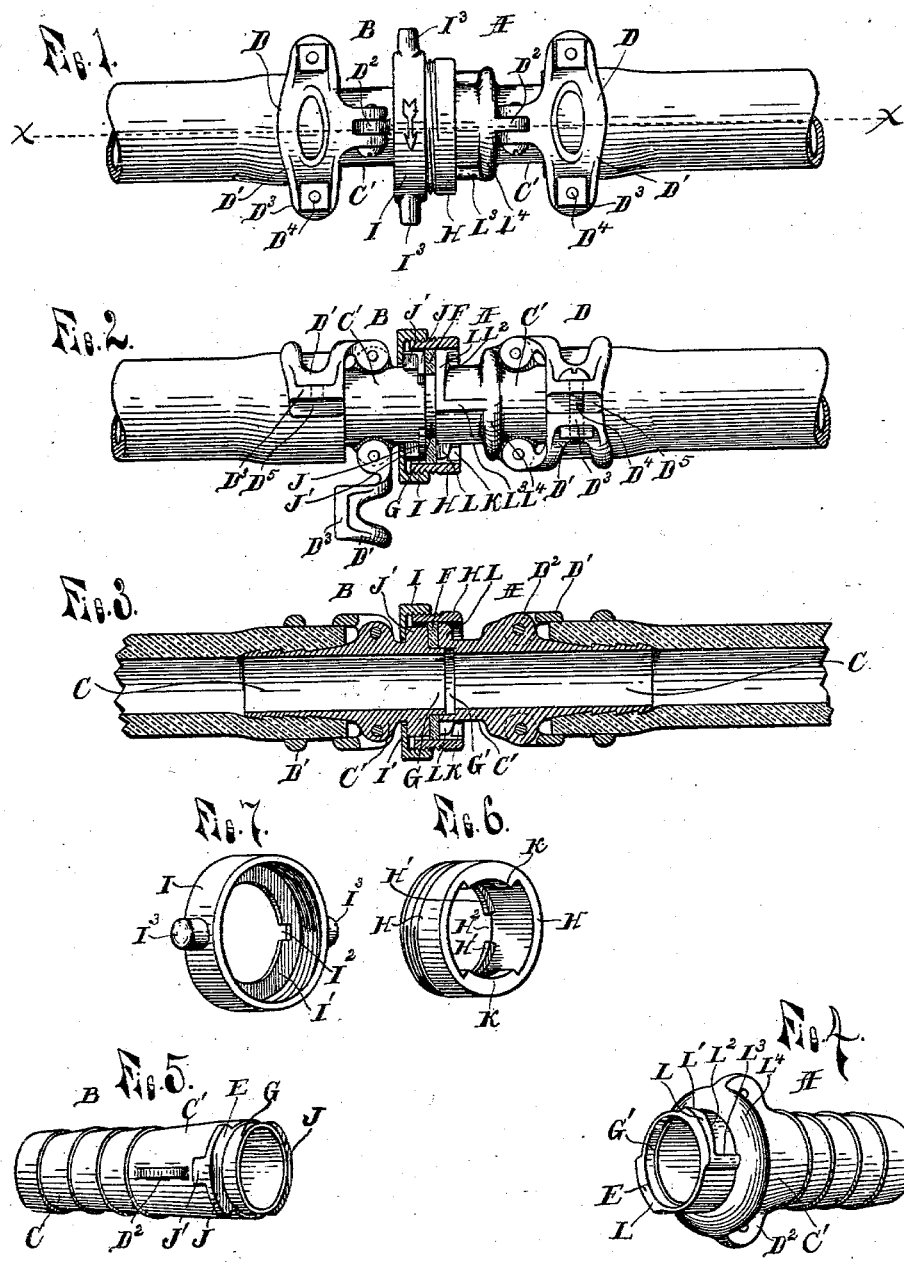
WITNESSES.
INVENTOR.
George Stroh No. 758,155. Patented April 26, 1904.

UNITED STATES PATENT OFFICE.

GEORGE STROH, OF DETROIT, MICHIGAN.

HOSE-COUPLING.

SPECIFICATION forming part of Letters Patent No. 758,155, dated April 26, 1904.

Application filed March 18, 1903. Serial No. 148,286. (No model.)

*To all whom it may concern:*

Be it known that I, GEORGE STROH, a citizen of the United States of America, residing at Detroit, in the county of Wayne and State of Michigan, have invented certain new and useful Improvements in Hose-Coupling, of which the following is a specification, reference being had therein to the accompanying drawngs.

This invention relates to improvements in hose-couplings; and its object is to provide a coupling which is so constructed that when the two members are disconnected the parts of each member will be so joined and held that they cannot become accidentally detached and lost, but will always be in place, so that the members may be readily joined.

It is also an object of the invention to so arrange and construct the device that the packing-washer will be inclosed by one of the members and prevented from projecting into and obstructing the passage through the coupling when the members are connected and the packing compressed and will also be protected and prevented from getting out of place or detached and lost when the members are disconnected; and a further object is to provide a coupling so constructed that the parts are easily assembled, no riveting or bolts being required, and are not liable to become broken.

A further object of the invention is to provide the coupling with suitable and efficient means for securing the hose to the coupling and to provide the device with certain other new and useful features, all as hereinafter more fully described, and particularly pointed out in the claims, reference being had to the accompanying drawings, in which—

Figure 1 is an elevation of a device embodying the invention; Fig. 2, a view taken at right angles to that of Fig. 1 with parts in section to show the construction; Fig. 3, a section on the line $xx$ of Fig. 1. Fig. 4 is a perspective view of the male member of the coupling; Fig. 5, a perspective view of the female member with its coupling-sleeve and adjusting-nut removed. Fig. 6 is a perspective view of the coupling-sleeve, and Fig. 7 a similar view of the adjusting-nut.

As shown in the drawings, A is the male, and B the female, member of the coupling, each of which is provided with a nipple C, to which the hose is attached and secured by the clamps D. The members are also formed each with a head $C'$, and ears $D^2$ project outward from each side of the heads, to which ears the like parts or halves $D'$ forming each clamp are pivotally attached by screws passing through said ears and through ears on the halves. The halves of the clamp are curved to embrace the hose when turned into engagement therewith, and outwardly-projecting ears $D^3$ on each half are provided with openings to receive the bolts $D^4$ for drawing the halves toward each other to firmly clamp the hose. On each half is a lug $D^5$, which projects outward from one of the ears toward the opposing ear and forms a continuation of the inner curve of said clamp to prevent the hose from being pinched between the ears, each lug being tapered toward its outer end, so that it will be forced beneath the opposing half and not interfere in firmly clamping the hose when it is necessary to draw the clamping parts near together in order to clamp the hose firmly.

Formed at the end of each head $C'$ is an annular seat E, between which seats the packing-ring F is compressed when the members are coupled together, and projecting from the seat of the member B is a thin tubular extension G, which is integral with the head and of the same inside diameter and upon which the packing-ring F is sleeved. The head of the member A is bored out at $G'$ to receive the projecting tubular extension G, so that when the members are coupled this tubular extension will project into the member A, making a lap-joint and at the same time providing an inner seat for the packing-ring to prevent it from projecting into and restricting the way through the coupling, and thus making a smooth and straight inner bore.

H is a coupling-sleeve, and I an adjusting-nut, both sleeved on the head $C'$ and forming a part of the female member B, and to hold said nut and sleeve against the possibility of becoming detached and lost, said head is provided with an interrupted flange J, one side of which forms the seat E and integral with the other side of which are the lugs or ribs J in line with the ears $D^2$, and on both the nut I and sleeve H are inwardly-projecting flanges I' and H', respectively, the flange I' being notched at I² to allow the ears D² to pass and the flange H' being notched at H² to receive the lugs J' when the nipple C and head C' are passed through the nut and sleeve in assembling. The sleeve and adjusting-nut are thus held upon the head by the engagement at one side of the flange J with the flange H' and at the opposite side by the parts of the clamp which are secured to the ears D² after the nut and sleeve have been slipped into place.

The nut I is provided with outwardly-projecting lugs I³, by means of which it is turned or for the engagement of a wrench, and said nut is internally screw-threaded to receive the sleeve H. Therefore by turning the nut, which is held from longitudinal movement on the head C' by the ears D² at one side of its flange I' and the lugs J' at the opposite side the sleeve will be moved longitudinally of the head, said sleeve being prevented from turning on the head by the engagement of the lugs J' with the notches H² in its flange H'. The sleeve H is also provided with two inwardly-projecting coupling-lugs K at its outer end, and on the head of the male member A are two corresponding outwardly-projecting coupling-lugs L, one side of each of which is in the same plane and forms a part of the seat E, and the other side is formed with an abrupt or short incline L' at one end and a long reverse incline L² terminating at a stop L³ or rib connecting the end of said lug and an annular strengthening-rib L⁴. The inner sides of the coupling-lugs K are also formed with inclines which correspond to the long inclines L², so that when the head of the male member A is inserted in the sleeve H and turned until the wide ends of the coupling-lugs K strike the stops L³ at the narrow ends of the lugs L the lugs will interlock, and by then turning the nut I to retract the sleeve and grip the coupling-lugs L between the lugs K and the packing-ring F the members will be securely locked together and no amount of twisting of the hose will uncouple the parts.

By constructing the device as described a very strong and efficient coupling is secured, which is especially adapted for hose carrying a high pressure and which are carelessly handled by inexperienced persons, as when the coupling-lugs are interlocked and the adjusting-nut turned the members will not become uncoupled by dragging or twisting the hose, and by assembling the parts as described there is no possibility of any becoming detached, as the clamps must be taken off before the nut or sleeve can be removed, and the packing-ring is inclosed on three sides and the lugs K project over the fourth side at a short distance therefrom.

The tubular extension G not only assists in holding the packing in place and prevents it from being pressed into the passage, but by being extended a short distance beyond the packing forms means for centering the members and aids in coupling the hose.

Having thus fully described my invention, what I claim is—

1. In a hose-coupling, the combination with a male member provided with coupling-lugs, of a female member formed with a head, an outwardly-projecting interrupted flange on said head, lugs on said head at one side of said flange, a coupling-sleeve sleeved on said head and provided with coupling-lugs at one end and with an inwardly-projecting flange at the opposite end having notches to engage the said lugs, an internally-screw-threaded adjusting-nut sleeved on said head to engage and move said sleeve and provided with an inwardly-extending flange to engage said lug at one side, and means secured to the head at the opposite side of said flange to hold said nut from longitudinal movement on the head.

2. In a hose-coupling, the combination of a male member having a head formed at one end with a seat for a packing-ring, outwardly-extending lugs on said head, one side of which form a portion of said seat and which are formed at the opposite side with a short incline at one end and a long reverse incline terminating in a stop, a female member having a head formed with a seat for a packing-ring, an adjusting-nut on said female member, a coupling-sleeve engaging said nut and inwardly-projecting lugs on said sleeve having inner sides formed with long inclines extending in a direction opposite to the long inclines on the male member, whereby when the parts are turned to bring these long inclines into contact the lugs will be interlocked and the members firmly united.

3. In a hose-coupling, the combination of a female member provided with a nipple for the attachment of the hose, a head having a seat for the packing-ring, a tubular extension on said head projecting from said seat with its bore forming a continuation of the bore of the head, an interrupted flange projecting outward from said head, lugs at one side of said flange and integral therewith, ears on the head at a distance from said lugs and in line therewith, a coupling-sleeve on said head provided with inwardly-projecting coupling-lugs at one end and an inwardly-projecting flange at the opposite end having notches to engage the lugs on the head, and an internally-screw-threaded adjusting-nut to engage the sleeve and having an inwardly-projecting flange to extend between the lugs and ears on the head and hold the nut from longitudinal movement, said flange being notched to pass the ears in assembling, a clamp secured to said ears to secure the hose to the nipple, a packing-ring sleeved on said tubular extension, a male member formed with a head having a seat for a packing-ring and an enlarged bore to receive the tubular extension of the female member, outwardly-projecting coupling-lugs on said head, an annular rib on said head, a rib forming a stop connecting one end of each coupling-lug with the annular rib, ears on said head, a nipple to engage the hose, and a clamp secured to said ears to secure the hose to the nipple.

4. In a hose-coupling, the combination of a female member provided with a nipple for the attachment of the hose, a head having a seat for the packing-ring, a tubular extension on said head projecting from said seat with its bore forming a continuation of the bore of the head, an interrupted flange projecting outward from said head, lugs at one side of said flange and integral therewith, ears on the head at a distance from said lugs, a coupling-sleeve on said head provided with inwardly-projecting coupling-lugs at one end and an inwardly-projecting flange at the opposite end having notches to engage the lugs on the head, and an internally-screw-threaded adjusting-nut to engage the sleeve and having an inwardly-projecting flange to extend between the lugs and ears on the head and hold the nut from longitudinal movement, said flange being notched to pass the ears in assembling, a clamp secured to said ears to secure the hose to the nipple, a packing-ring sleeved on said tubular extension, a male member formed with a head having a seat for a packing-ring and an enlarged bore to receive the tubular extension of the female member, outwardly-projecting coupling-lugs on said head, a stop on one end of each coupling-lug, ears on said head, a nipple to engage the hose and a clamp secured to said ears to secure the hose to the nipple.

In testimony whereof I affix my signature in presence of two witnesses.

GEORGE STROH.

Witnesses:
OTTO F. BARTHEL,
LEWIS E. FLANDERS.